United States Patent [19]

Robinson

[11] Patent Number: 4,830,445
[45] Date of Patent: May 16, 1989

[54] HOLOGRAPHIC DISPLAY APPARATUS

[76] Inventor: Anthony J. Robinson, 46 Castelnau Mansions, Barnes, London, United Kingdom, SW13 9QU

[21] Appl. No.: 62,475
[22] PCT Filed: Aug. 7, 1986
[86] PCT No.: PCT/GB86/00479
   § 371 Date: Apr. 6, 1987
   § 102(e) Date: Apr. 6, 1987
[87] PCT Pub. No.: WO87/00954
   PCT Pub. Date: Feb. 12, 1987

[30] Foreign Application Priority Data

| Aug. 7, 1985 [GB] | United Kingdom | 85 19766 |
| Sep. 25, 1985 [GB] | United Kingdom | 85 23708 |
| Oct. 22, 1985 [GB] | United Kingdom | 85 26037 |
| Feb. 6, 1986 [GB] | United Kingdom | 86 03019 |
| Feb. 12, 1986 [GB] | United Kingdom | 86 03387 |
| Apr. 1, 1986 [GB] | United Kingdom | 86 07862 |
| Jun. 10, 1986 [GB] | United Kingdom | 86 14007 |
| Jul. 16, 1986 [GB] | United Kingdom | 86 17300 |

[51] Int. Cl.$^4$ .............................................. G02H 1/24
[52] U.S. Cl. .................................. 350/3.85; 350/3.86; 353/88; 353/99
[58] Field of Search .................. 350/3.6, 3.75, 3.78, 350/3.79, 3.85, 3.86; 353/88, 99

[56] References Cited

U.S. PATENT DOCUMENTS

| 3,751,589 | 8/1973 | Patels et al. | 350/3.85 |
| 3,826,555 | 7/1974 | Matsumoto | 350/3.6 |
| 3,887,276 | 6/1975 | Clay et al. | 350/3.6 |
| 3,917,379 | 11/1975 | Noguchi | 350/3.6 |
| 4,390,234 | 6/1983 | Embach | 350/3.85 |
| 4,429,947 | 2/1984 | Benton | 350/3.85 |
| 4,486,070 | 12/1984 | Benton | 350/3.85 |
| 4,623,215 | 11/1986 | Bazargan | 350/3.85 |

FOREIGN PATENT DOCUMENTS

| 0086604 | 8/1983 | European Pat. Off. . |
| 2707325 | 8/1977 | Fed. Rep. of Germany . |

OTHER PUBLICATIONS

Sato et al., "Cylindrical Rainbow Hologram," Applied Optics, vol. 24, No. 14, Jul. 15, 1985, pp. 2161-2165.

Primary Examiner—Bruce Y. Arnold
Assistant Examiner—Martin Lerner
Attorney, Agent, or Firm—Lowe, Price, LeBlanc, Becker & Shur

[57] ABSTRACT

A holographic display apparatus, for displaying an image embodied in a hologram, has a hologram support for receiving and supporting a hologram in a viewing position, a reference light source disposed adjacent a boundary of the hologram support in a predetermined baffled position such that light emanating from the source cannot fall directly onto a hologram supported on the support, and at least one light reflecting surface disposed adjacent that boundary of the support and arranged to direct light from the source onto a hologram supported on the support so as to be incident on the hologram at a predetermined acute reference angle, which angle corresponds substantially to the angle of incidence relative to the hologram of a predetermined reference light used in producing that hologram. The at least one reflecting surface may be planar, or curved in one or more directions. Holograms in a variety of different forms may be illuminated.

51 Claims, 10 Drawing Sheets

HOLOGRAPHIC DISPLAY APPARATUS

TECHNICAL FIELD OF THE INVENTION

This invention relates to holographic display means, that is to say to means arranged to display images of three dimensional objects by means of illuminated holograms, which images portray in life-like manner the real objects used in producing the holograms, and give the impression to a viewer that the object whose image is portrayed in the display is really present. For example, with such displays, the image is seen to move in a realistic way when the viewer moves his observation position relative to the object portrayed in the display means.

BACKGROUND OF THE PRIOR ART

Holographic display means currently available are bulky pieces of scientific or industrial equipment which have large dimensions and volumes, use long light paths and divergent light beams, and utilize in a very inefficient way the light emanating from the light source incorporated therein. Such equipment is thus not at all suitable in commercial fields of display, such as in shops, exhibitions and advertising locations; nor is it particularly convenient to use or productive of accurate reproduction of holographic images in scientific work.

The present invention seeks to overcome the disadvantages of the prior art display means, and to provide a display apparatus which is more compact, and efficient in utilising the light sources that are currently available.

Disclosure of the Invention

According to the present invention a holographic display means for displaying an image holographically embodied in a hologram comprises a unit which incorporates -
- (a) a hologram support for receiving and supporting a hologram, of either a reflection or a transmission type, in a viewing position;
- (b) a reference light source disposed adjacent a boundary of the hologram support in a predetermined position such that light emanating from the source when energized cannot fall directly on to a hologram supported on the support; and
- (c) a light reflecting means disposed adjacent the boundary of the support and arranged to direct light from the source on to a hologram supported on the support so as to be incident on the hologram at a predetermined acute reference angle, which angle corresponds substantially to the angle of incidence relative to the hologram of a predetermined reference light used in producing that hologram.

The reflecting means preferably includes reflecting surface means arranged to reflect light from the source not more than twice before it becomes incident on the hologram; and in some cases it is preferred that the reflecting surface means reflects light from the source only one before it becomes incident on the hologram.

The reflecting surface means may comprise a planar reflecting surface for reflecting light from the source directly on to the hologram at the said acute reference angle.

Alternatively, or in addition, the reflecting surface means may include a reflecting surface which is curved in a first manner such as to collimate the light reflected thereby on to the hologram. That reflecting surface may also be curved in a second manner orthogonal to the first curvature of that reflecting surface, thereby to concentrate light received from the source on to the hologram.

The support may be arranged to receive and support holograms having, for example, planar, cylindrical, convex or concave form, or any combination of such forms, e.g. plano-concave form, plano-convex form or a combination of those forms. The reflecting surface means are shaped accordingly to suit the form of the hologram.

Other preferred features of the present invention will appear from a reading of the description that follows hereafter, and of the claims appended at the end of that description.

Various different forms of holographic display apparatus according to the present invention, and various modifications thereof, will now be described by way of example and with reference to the accompanying diagrammatic drawings.

DESCRIPTION OF THE PREFERRED EMBODIMENTS

In the description that follows hereafter of the various display devices, any part that is common with or closely analogous to a part already mentioned in respect of an earlier device will bear the same reference as the part of the earlier device, unless the context requires otherwise.

Figure 1:
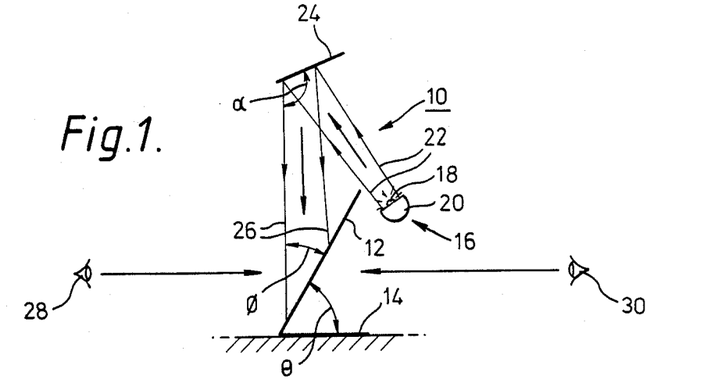
FIG. 1 shows schematically in side view the optical arrangement of an illumination system incorporated in a first embodiment of a holographic display unit or device of the present invention.

Referring now to the FIG. 1, the holographic display device incorporates an optical illumination system 10 which is enclosed with a casing (not shown). That illumination system comprises a planar hologram 12 (or holographic plate) which is supported at a predetermined angle $\theta$ to the horizontal base plate 14. A light source 16, comprising a small electric light-emitting bulb 18 mounted in a bowlshaped reflector 20, is supported in the casing to the rear of the hologram, and is arranged to project a broad light beam 22 upwards at a predetermined angle so as to be incident on and be reflected by an inclined, planar reflecting surface 24, which is disposed in the casing on the side of the hologram opposite to that on which the light source is disposed.

Figure 2:
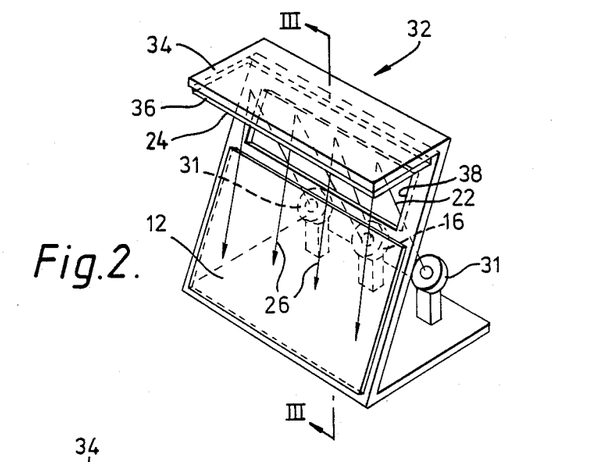
FIG. 2 shows pictorially the general arrangement of that illumination system.
Figure 3:
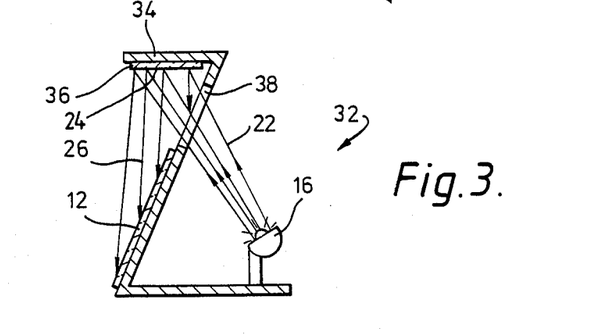
FIG. 3 shows a cross section taken on a central, vertical plane (plane III—III of FIG. 2) of the illumination system.

That reflecting surface 24 is angularly positioned so that the reflected light beam 26 is incident at a predetermined angle $\phi$ on the hologram 12, which angle is equal to (or substantially so) the predetermined angle at which a reference light beam had previously impinged on the hologram so as to incorporate within it a desired holographic image of an object. As best seen in FIGS. 1–3, is preferably an acute angle.

With the light source energized, a reflective type hologram supported at the position shown would be viewed from the side thereof indicated by an observer's eye 28, whilst a transmission type hologram positioned as shown would be viewed from the side thereof indicated by the observer's eye 30.

If desired, instead of using a single light source 16, a plurality of similar light sources (possibly of different colors) (see FIG. 2, reference 31) may be used, suitably spaced apart to provide any desired number of sources of suitably broad beam reference light.

Furthermore, one or more other hologram illumination systems similar to that constituted by the light source 16 (or sources 31) and the associated reflector 24 may be arranged at one or both vertical sides, and/or the bottom of the hologram 12, so as to illuminate other latent holographic images incorporated in the hologram. In such a case, the viewer would perceive respective images produced holographically by the respective illumination systems directing light on to the hologram at the predetermined reference angles necessary for reproducing those multiple images, as and when the respective illumination systems are energized.

The system described so far may be mounted in any suitable form of casing, frame or chassis according to the nature of the intended use of the display device. In every case, the illumination system and the enclosure for it are arranged so that no light reaches the hologram except by way of a reflecting surface 24.

FIGS. 2 and 3 show a module 32 incorporating the illumination system of FIG. 1. That module comprises essentially a Z-shaped support frame 34 on which a reflective member 36 incorporating the reflecting surface 24, the hologram 12, and the light source 16 are mounted in the manner shown on the respective limbs of that frame, an aperture 38 being provided so as to enable the light beam 22 to be incident on the reflecting surface 24.

It is desirable in constructing the illumination systems described above to reduce as far as possible the length of the light path from the light source to the hologram, consistent with ensuring that the hologram is illuminated only by light received from the reflecting surface 24; and to place the light source 16 as near as possible to the reflecting surface 24, so as to capture as much as possible of the light emanating from the light source. In this way, it is possible to arrange that the light beam reaching the hologram has a greater intensity than in the prior art devices, so that better holographic images are produced.

In such prior art devices, the light path has been made deliberately long as to achieve, with a diverging light beam, sufficient broadening of the beam to cover the whole extent of the hologram; and then to reduce the size of such devices, it has been necessary to fold the light path back on itself by means of various reflectors, with the result that the light path had a generally C-shaped configuration.

Referring now to the FIG. 4, the optical system of the second display device is generally similar to that shown in the FIG. 1, with the exceptions that (i) the hologram support 40 carries at its upper end a light baffle 42 which projects forwardly over the hologram 12 supported below it and shields the hologram from the light source 44 which is disposed above the baffle 42, (ii) the light source comprises simply a small, high intensity, electric bulb such as a quartz-halogen bulb, without any reflector behind it, (iii) the light source is positioned as close as is possible to the reflecting surface 24, and (iv) the reflecting surface is plano-concave towards the light source, the concavity being in the transverse (horizontal) direction and collimating (to an extent dependent on the degree of curvature of the surface) the beam which is incident on the hologram.

The hologram may, if desired, be carried on the support frame in an adjustable manner, so that the position and/or the angle of the hologram with respect to the incident illuminating light beam 26 may be varied as desired, thereby to vary or change the image perceived by an observer of the hologram. For example, by adjusting the angle of the hologram relative to the incident beam 26, a first holographic image may disappear and give way to other images which appear sequentially as the angle of incidence of the light beam on the hologram passes through successive other reference angles which correspond to respective reference light angles used for holographically incorporating those successive images in the hologram.

Figure 4:
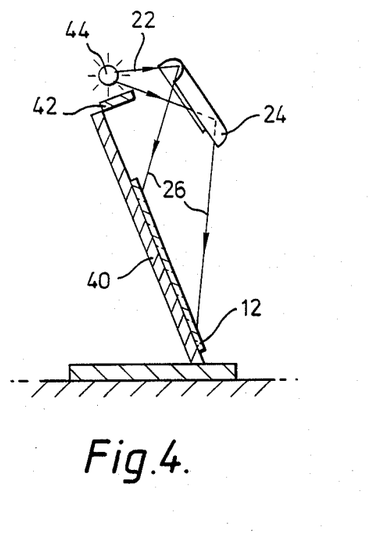
FIG. 4 shows (in a view similar to that of FIG. 3) a cross section taken on a central, vertical plane of a second holographic embodiment of display device of the present invention.
Figure 5:
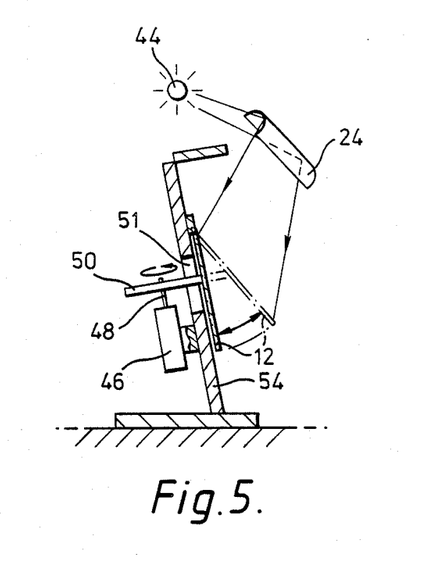
FIG. 5 shows a cross sectional view similar to that of FIG. 4, showing a first modified form of that second display device.

FIG. 5 shows a modified form of the device shown in the FIG. 4, in which modified form the hologram 12 is disposed in a carrier which is itself hingedly supported at its upper boundary for upward pivotal movement about that boundary. A geared motor unit 46 carries on its output shaft 48 a cam 50 whose peripheral part extends through an aperture 51 formed in the hologram support frame 54 to contact the rear side of the hinged hologram carrier. Energization of the motor unit 46 causes rotation of the cam, with the result that the hologram is cyclically pivoted about its upper boundary in accordance with the shape of the cam periphery. In this way, an animated display can be achieved with a hologram in which many images have been holographically incorporated using successively different reference light incidence angles.

Figure 6:
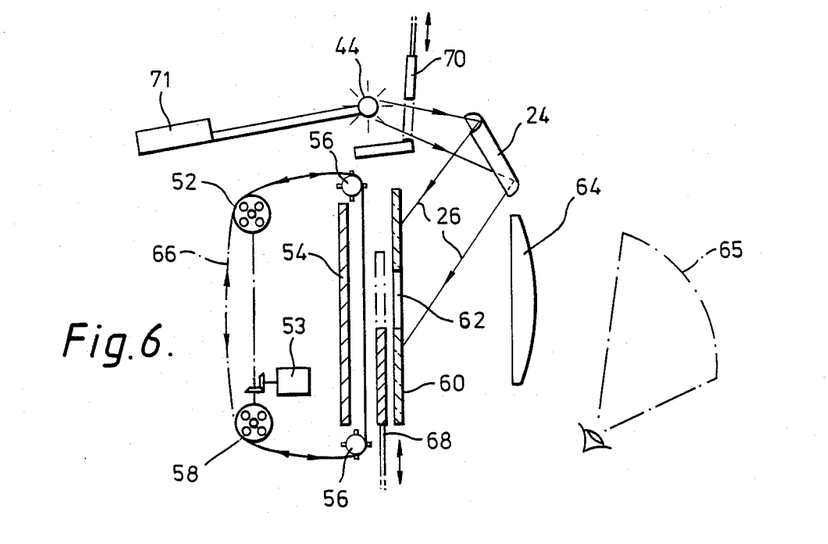
FIG. 6 shows a cross sectional view similar to that of FIG. 4, showing a second modified form of that second display device.

FIG. 6 shows a further modification of the device of FIG. 4, in which modification the planar hologram (normally a holographic plate) of the FIG. 4 is replaced by a spool of film 52 which embodies in successive frames thereof successive holograms embodying different holographically recorded images. Driving means 53 are provided for transporting that film from its spool 52 over a hologram support plate 54, and sprockets 56 disposed at the respective ends of that support plate, to a take-up spool 58.

An apertured mask 60 having an aperture or transparent window 62 covers the film and exposes only one frame of the film at a time to the reflected light beam 26 received from the light source 44 via the reflecting surface 24. With the light source intermittently energised in synchronism with the movement of the film frames across the mask aperture 62, an observer perceives successive holographic images in the aperture 62. By this arrangement an animated display can be produced.

A magnifying lens 64 may be provided so as to enlarge the perceived holographic images, e.g., when those images are recorded on 35 mm film. Alternatively, these images may be magnified by the use instead of a suitable reflector system, e.g., as shown at reference 65.

As an alternative to winding the film back and forth from spool to spool, a continuous loop 66 of film may be used instead to provide an endless, cyclic succession of holographic images.

A movable shutter 68 may be provided for closing off, manually or otherwise, the mask aperture 62, and a further movable shutter 70 may be provided for interrupting the passage of light to the reflecting surface 24. Furthermore, the light source may be mounted on a movable carriage or slide 71 so as to permit its displacement relative to the reflecting surface, whereby to move the path of the reflected light beam 26 and so alter its angle of incidence on the film, for the purpose of revealing different holographic images, or a desired distortion of the holographic images that are to be seen through the aperture 62.

Any or all of the movable shutters and the movable light source carriage may be operated by appropriate driving means under the control of, for example, an automatic control device, whereby to produce any desired animation sequence of holographic images. Where the light source is intended to be continuously energized, the light beam is modulated by means of the shutter 70.

The hologram may be mounted, instead, on a rotatable support for rotation about the centre of the hologram, whereby to bring different sectors of the hologram into a position adjacent a mask aperture, so as to reveal a succession of holographic images embodied in the successive sectors of the hologram.

Figure 7:
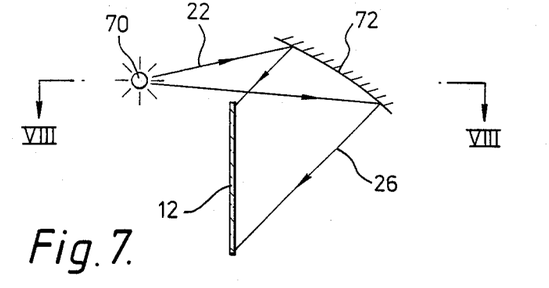
FIG. 7 shows schematically, in a cross section taken on a central, vertical plane (plane VII—VII in FIG. 8), the optical arrangement of an illumination system incorporated in a third embodiment of the holographic display device.
Figure 8:
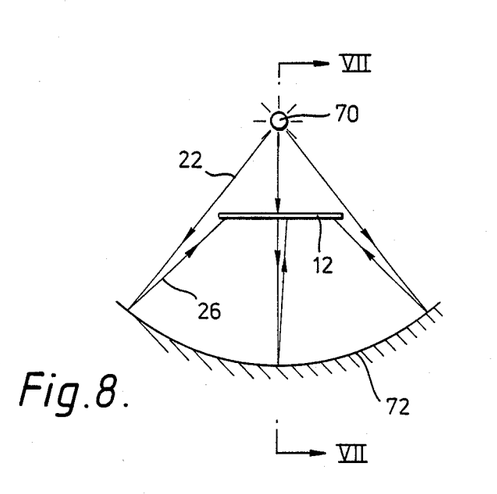
FIG. 8 shows schematically a cross section taken on a horizontal plane VIII—VIII of the FIG. 7.
Figure 9:
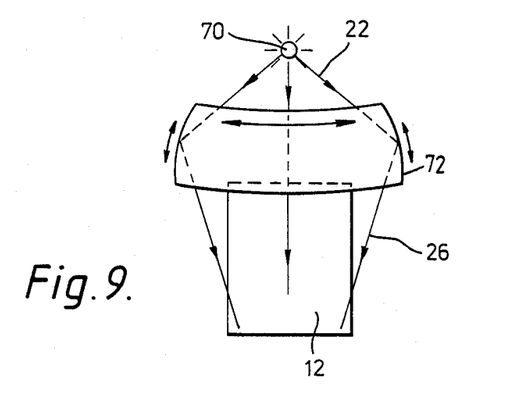
FIG. 9 shows a front view of the display device of FIGS. 7 and 8.

The FIGS. 7 to 9 show a display device in which the light source comprises a small high intensity electric bulb 70 (e.g., a quartz-halogen bulb) without a beam-forming reflector. The reflecting surface 72 comprises a surface which is concave in both the vertical and the horizontal directions as indicated in the FIGS. 7 and 8 respectively. The concavities in the respective directions are intended to provide collimation of the light from the bulb in mutually orthogonal directions, i.e., so that all rays of light leave the reflecting surface in substantially parallel directions or if desired, have a predetermined convergence or divergence. it should be noted that in that reflecting surface, the contour of the surface at different horizontal planes varies from horizontal plane to horizontal plane.

This arrangement gives very good results despite the fact that no reflector is associated with the light source, since the light source is to all intents and purposes a small point source for which the reflective surface can be readily designed and produced.

Figure 10:
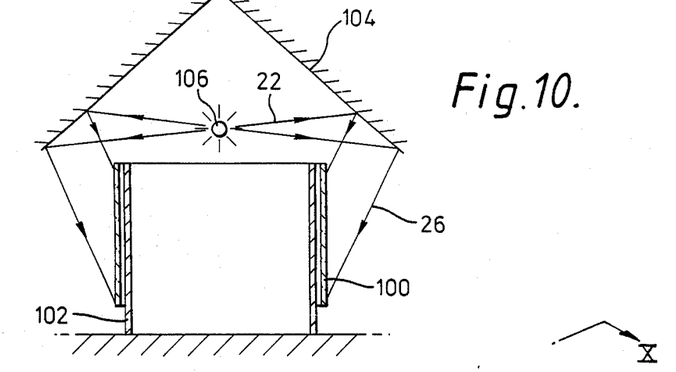
FIG. 10 shows schematically, in a cross section taken on a central, vertical plane (plane X—X in FIG. 11), the optical arrangement of an illumination system incorporated in a fourth embodiment of the holographic display device.
Figures 11, 12:
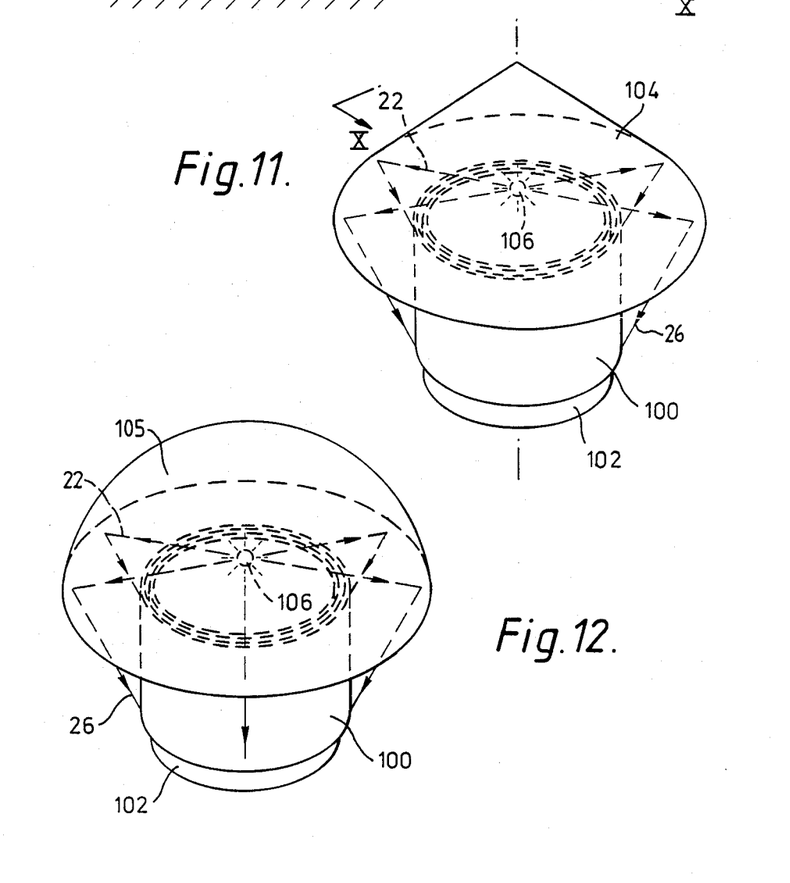
FIG. 11 shows pictorially that fourth display device.
FIG. 12 shows pictorially a modified form of that fourth display device.

The FIGS. 10 and 11 show a display device in which a cylindrical hologram 100 is carried on a cylindrical internal support 102. A conical reflecting surface 104 is disposed above the upper end of the hologram in overlapping relationship, and a point light source 106 (constituted by a high intensity, quartz-halogen light bulb without a beam-producing reflector) is disposed centrally between the upper end of the hologram and the conical reflecting surface, in a position such that the external cylindrical surface of the hologram is illuminated at the desired reference angle by reference light transmitted by reflection from the conical reflecting surface, thus revealing holographic images recorded in the hologram.

In a modification of the display device just described, the conical reflecting surface is replaced by an inverted, bowlshaped (e.g., hemi-spherical) reflecting surface formed internally on a supporting shell.

In all of the display devices so far described, the light emanating from the reference light source is reflected only once before becoming incident on the hologram surface. In the display devices about to be described below, the reference light is reflected at two mutually inclined reflecting surfaces before arriving at the hologram surface.

Figures 13, 14:
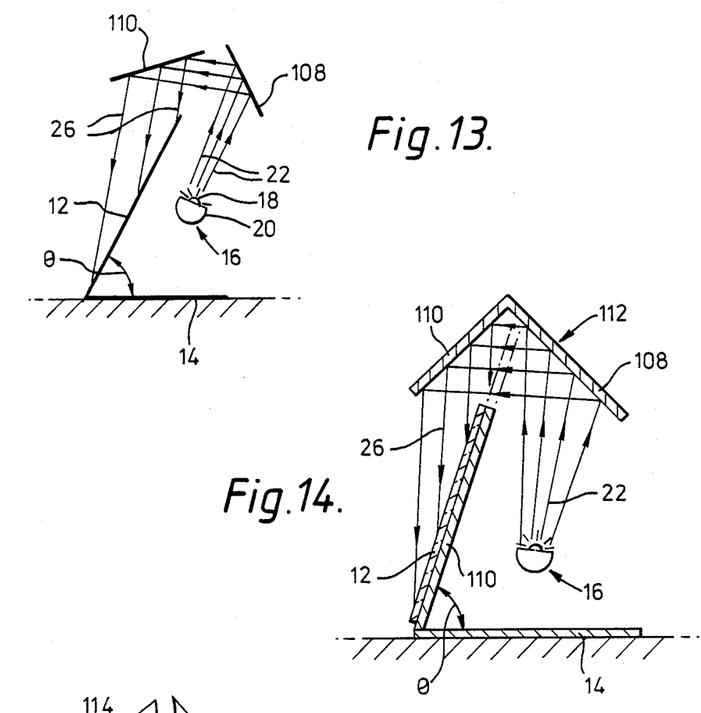
FIG. 13 shows schematically, in a view similar to that of FIG. 1, the optical arrangement of an illumination system incorporated in a fifth embodiment of the holographic display device.
FIG. 14 shows, in a view similar to that of the FIG. 3, a cross section taken on a central, vertical plane of the illumination system of that fifth display device.

Referring now to the FIGS. 13 and 14. The illumination system of the device there shown is generally similar to that of the FIG. 1, with the exception that the light emanating from the light source 16 (constituted by an electric bulb 18 mounted in an associated reflector 20) is reflected first at a planar reflecting surface 108 disposed to the rear of the planar hologram 12 carried on the hologram support, and then by a planar reflecting surface 110 that lies to the front of the hologram 12. In the Figure 14, the two reflecting surfaces are provided on the internal surfaces of an angle member 112.

Figure 15:
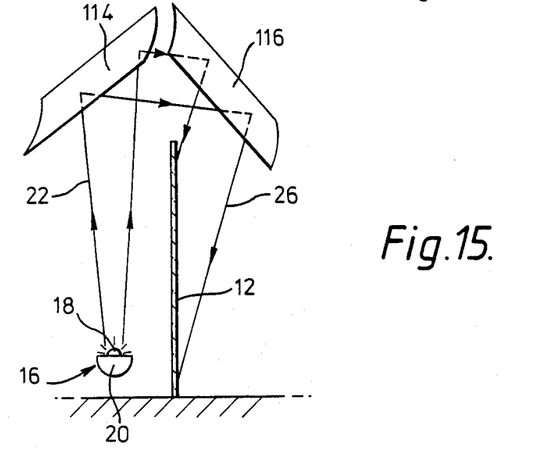
FIG. 15 shows schematically, in psuedo-side elevation, the optical arrangement of an illumination system incorporated in a sixth embodiment of the holographic display device.
Figure 16:
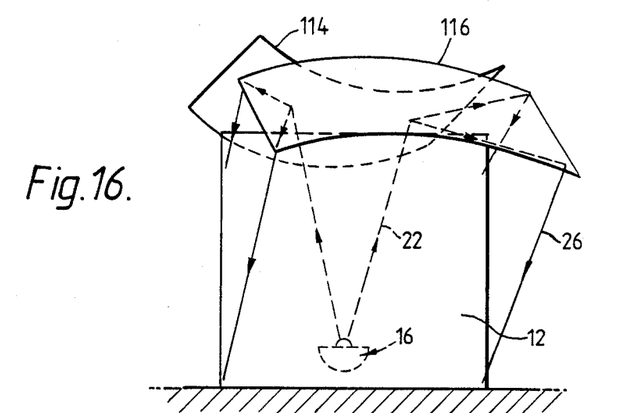
FIG. 16 shows pictorially and schematically the optical arrangement of the illumination system of that sixth display device.

In the display device illustrated in the FIGS. 15 and 16, the planar reflecting surfaces 108, 110 of FIG. 13 are replaced by plano-convex and plano-concave reflecting surfaces 114, 116, which serve respectively to expand the light beam 22 incident thereon from the source 16 (an electric bulb 18 and an associated reflector 20), and to collimate (or otherwise control the convergence or divergence of) the beam reflected on to the hologram surface at the desired reference angle. In this arrangement, the beam is collimated in the vertical or the horizontal plane.

If desired, either of (a) the plano-convex reflecting surface 114 and (b) the plano-concave reflecting surface 116 may be replaced by a planar reflecting surface.

Figures 17, 18:
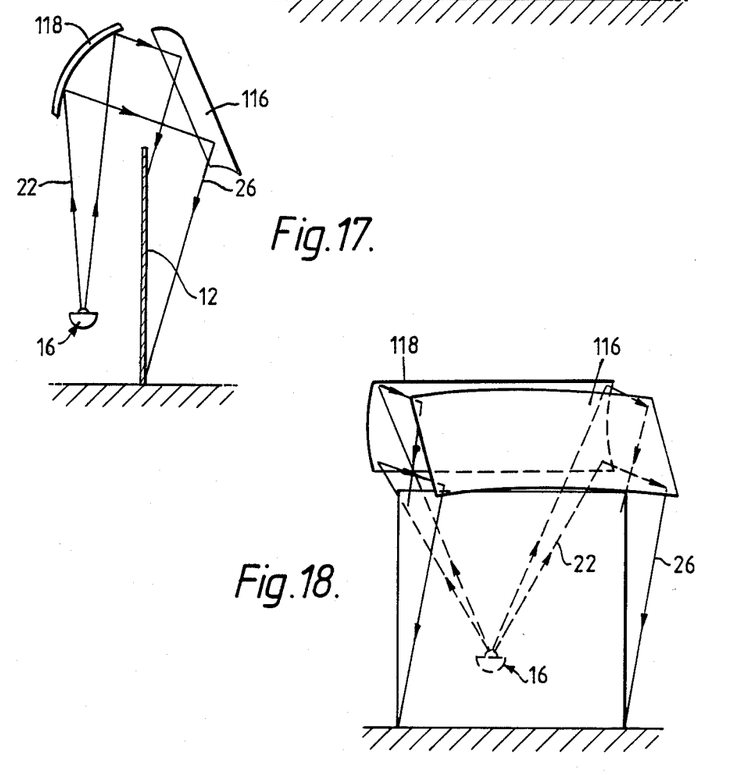
FIG. 17 shows schematically, in pseudo-side elevation, the optical arrangement of an illumination system incorporated in a modified form of that sixth holographic display device.
FIG. 18 shows pictorially and schematically the optical arrangement of the illumination system shown in the FIG. 17.

In the display devices of the FIGS. 17 and 18, the optical arrangement is generally similar to that of the FIGS. 15 and 16, but the vertically aligned plano-convex reflecting surface 114 is replaced by a horizontally aligned planoconcave reflecting surface 118. In this arrangement the beam is collimated in both the vertical plane and the horizontal plane.

Figure 19:
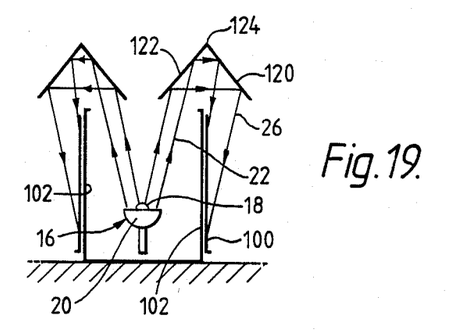
FIG. 19 shows schematically, in a cross section taken on a central, vertical plane (plane XIX—XIX in FIG. 20), the optical arrangement of an illumination system incorporated in a seventh embodiment of the holographic display device.
Figure 20:
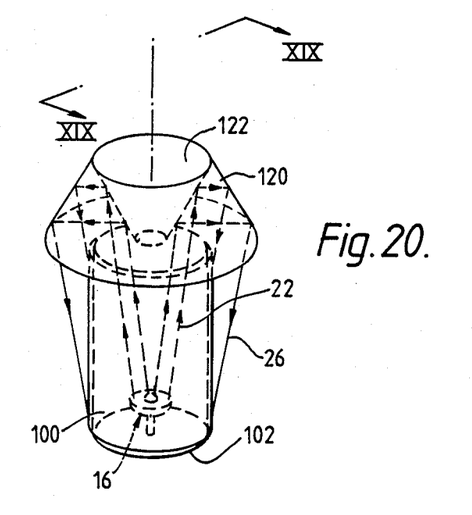
FIG. 20 shows pictorially that seventh display device.

In the display device shown in the FIGS. 19 and 20, the optical system constitutes an extension of the optical system of the FIGS. 15 and 16, and illuminates a cylindrical hologram 100 all way round its external cylindrical surface. The reflecting surfaces are constituted by a pair of oppositely directed frusto-conical surfaces 120, 122 having a common upper boundary 124. The light source 16 (an electric bulb 18 and an associated reflector 20) is disposed within the the interior of a hollow, cylindrical, hologram support 102 and on the vertical axis thereof. The reflecting surfaces provide a collimated conical shell of light which illuminates the external surface of the hologram at the desired reference angle, so as to reveal images recorded in the hologram.

Figure 21:
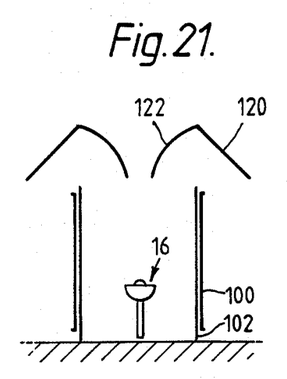
FIGS. 21 and 22 show in views similar to that of the FIG. 19, two modified forms of the optical arrangement of FIGS. 19 and 20.
Figure 22:
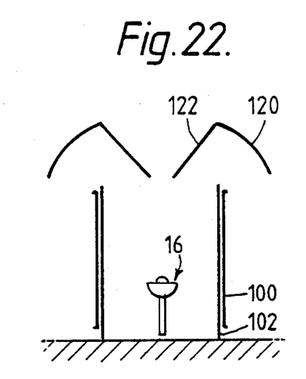

The reflecting surfaces 102, 122 may alternatively have diametral plane vertical cross sections as indicated in the FIGS. 21 and 22, which show modified forms of the device of FIGS. 19 and 20.

Figure 23:
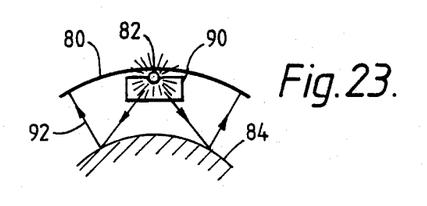
FIGS. 23 and 24 show schematically the optical arrangement of an eighth embodiment of the holographic display device, FIG. 23 being a plan view, and FIG. 24 being a pictorial view.
Figure 24:
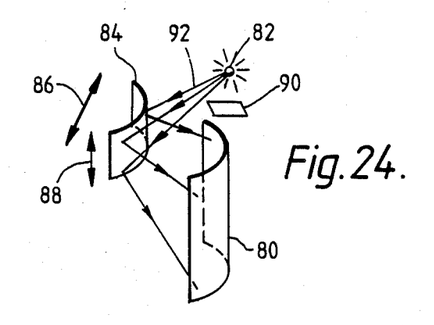

The display devices of the FIGS. 7 to 9 may be adapted in the manner shown in the FIGS. 23 and 24 to illuminate holograms which are non-planar. In those latter Figures, the hologram 80 is shown, by way of example, as being planoconcave in form, and is illuminated by a point light source (e.g., a quartz halogen bulb) 82 having no associated beamforming reflector, via a plano-convex reflecting surface 84 (which is convex in its latitude 86 and planar in its longitude 88). The hologram is shielded from direct illumination by the light source by a baffle plate 90, and the light path between the light source and the hologram is indicated at 92.

In a modified form of the display device of the FIGS. 23 and 24, the reflecting surface is plano-convex in its latitude 86 and plano-concave in its longitude 88. Such a modified display device is illustrated in the FIG. 25, where the respective components bear the references used for the same or analogous parts in the FIGS. 23 and 24.

Figure 25:
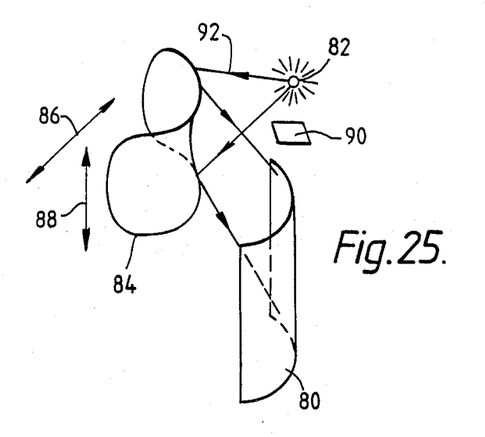
FIG. 25 shows, in a view similar to that of the FIG. 24, a modified form of the eighth a ninth embodiment of the holographic display device.

A hologram which is plano-convex instead may be illuminated in a manner which is analogous to that of the FIGS. 23 to 25, allowance being made in designing the reflecting surface 84 for the convexity, instead of the concavity, of the hologram.

Figure 26:
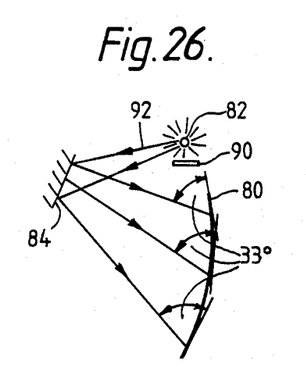
FIGS. 26 and 27 show schematically in a central, vertical cross section two alternative forms of a tenth embodiment of the holographic display device.
Figure 27:
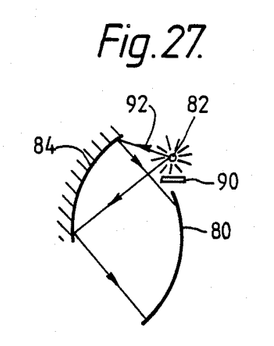

Holograms which are concave (as opposed to plano-concave) may be illuminated by means of a single reflecting surface which may be either (a) planar for providing a diverging light beam incident on the concave hologram, or (b) curved for providing a parallel or a converging beam incident on the concave hologram. Such arrangements are shown in the FIGS. 26 and 27 respectively, where the references used correspond to those used in the FIGS. 23 to 25. Holograms which are convex may be treated in an analogous manner.

Figure 28:
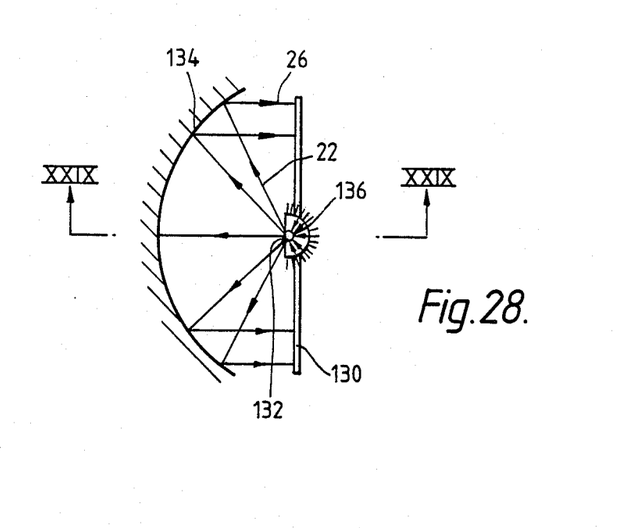
FIGS. 28 and 29 show schematically the optical arrangement of an eleventh embodiment of the holographic display device, FIG. 28 being a plan view, and FIG. 29 being a sectional view taken on the central vertical plane indicated at XXIX—XXIX in the FIG. 28.
Figure 29:
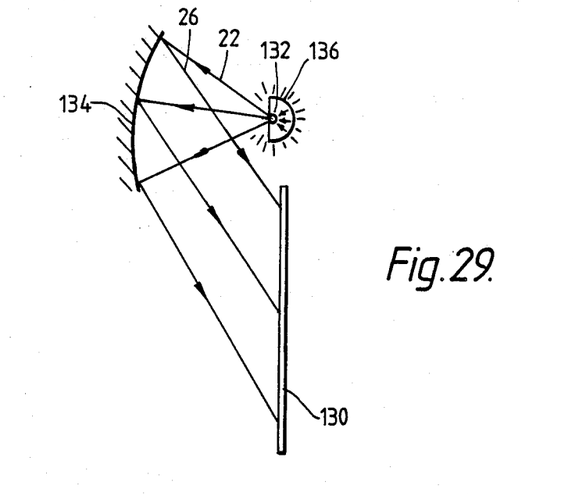

Referring now to the FIGS. 28 and 29, a planar hologram 130 is illustrated by a point light source (e.g., a quartz halogen bulb) 132 via a reflecting surface 134 which is curved in both its latitude and longitude to provide a desired controlled incident light beam (e.g., a parallel, divergent or convergent beam as required). The light source is provided with a rear reflector 136 which is designed to reflect light incident thereon back upon itself along the incident light path (or substantially so), and so enhance the spread of light which reaches the reflecting surface 134, without creating a beam of light.

Where the light source is of the kind in which light is emitted by an ionised gas such as Xenon i.e., a light source having no light-emitting hot metal filament), the reflected light path may be truly co-incident with the incident light path and thus pass directly through the light source to the reflecting surface 134. In that case, the focal point for the reflected light is coincident with the light source. on the other hand, where the light source is of the kind in which light is emitted by an incandescent metal filament, the reflector 136 is designed to have a focal point which is just in front of or just behind such metal filament.

The reflector 136 thus captures and reflects light from the rear side of the light source, and so enhances the useful output of the light source, and hence the efficacy of the hologram illumination system. Such a reflector may be used in any of the other embodiments described above, where appropriate. It should be noted that the reflector 136 does not produce an output beam of light; it merely redirects light incident thereon in the direction from which it came, and so enhances the light spreading out from the light source.

Although in the above described display devices, the hologram shave been shown in specific dispositions, they may be arranged in any other dispositions provided that the desired spatial relationship between the light source, the reflecting surface or surfaces, and the hologram is maintained. The hologram support in the respective embodiments may comprise, wherever appropriate, a solid backing member for the associated hologram, or alternatively. it may comprise simply an open frame member for giving the desired support to the hologram without obscuring the back of the hologram. Wherever appropriate, the curved reflecting surfaces may be of spherical or parabolic form.

The use, as a light source, of a small high intensity light producing bulb (e.g., a quartz-halogen bulb) without an associated beam-forming reflector is desirable in preference to a light source employing such a reflector, since the problems that can occur with the uneven distribution of light in a beam produced by a beam-forming reflector are thereby obviated. Thus, the higher intensity central hot spot and the surrounding satellite areas of greater brightness which are produced by many beam-forming reflectors are avoided.

Any feature disclosed in relation to any one of the various embodiments described above may be used, wherever appropriate, in any other one of those embodiments.

I claim:

1. A holographic display apparatus for displaying an image holographically embodied in a hologram, whether of a reflection type or of a transmission type, comprising:
   a hologram support for receiving and supporting said hologram in a viewing position;
   a light source disposed adjacent a boundary of said hologram support in a predetermined position such that light radiating from said light source when energized cannot fall directly onto a hologram supported on said support; and
   a lens-less, light directing means which includes a light reflecting means disposed adjacent said boundary of said support and arranged to direct light from said light source onto said hologram supported on said support so as to be incident on said hologram at a predetermined acute reference angle which corresponds substantially to an angle of incidence relative to said hologram of a predetermined reference light used in producing that hologram.

2. A holographic display apparatus according to claim 1, wherein:
   said light source and said light reflecting means are disposed beyond an end boundary of said hologram.

3. A holographic display apparatus according to claim 2, wherein:
   said light reflecting means includes a reflecting surface which is curved in a first manner such as to collimate the light reflected thereby onto said hologram.

4. A holographic display apparatus according to claim 3, wherein:
   said reflecting surface is also curved in a second manner orthogonal to said first manner of curvature of that reflecting surface, thereby to concentrate light received from said light source onto said hologram.

5. A holographic display apparatus according to claim 2, wherein:
   said reflecting surface means includes two reflecting surfaces for reflecting light from said element twice before it becomes incident on said hologram.

6. A holographic display apparatus according to claim 5, wherein:
   said reflecting surfaces are both planar.

7. A holographic display apparatus according to claim 5, wherein:
   a first one of said reflecting surfaces is curved in a first manner so as to collimate light reflected onto said hologram supported on said support.

8. A holographic display apparatus according to claim 1, wherein:
   said light reflecting means comprises a planar reflecting surface for reflecting light from said light source directly onto said hologram at said acute reference angle.

9. A holographic display apparatus according to claim 1, wherein:
   said support is arranged to receive and support a hologram in planar form.

10. A holographic display apparatus for displaying an image holographically embodied in a hologram, whether of a reflection type or of a transmission type, comprising:
    a hologram support for receiving and supporting said hologram in a viewing position;
    a light source disposed adjacent a boundary of said hologram support in a predetermined position such that light radiating from said light source when energized cannot fall directly onto a hologram supported on said support; and
    a lens-less, light directing means which includes a light reflecting means disposed adjacent said boundary of said support and arranged to direct light from said light source onto said hologram supported on said support so as to be incident on said hologram at a predetermined acute reference angle which corresponds substantially to an angle of incidence relative to said hologram of a predetermined reference light used in producing that hologram, wherein
    said light source and said light reflecting means are disposed beyond an end boundary of said hologram, said reflecting surface means includes two reflecting surfaces for reflecting light from said element twice before it becomes incident on said hologram, a first one of said reflecting surfaces is curved in a first manner so as to collimate light reflected onto said hologram supported on said support, and the second one of said reflecting surfaces is curved in a second manner orthogonal to said first manner of curvature of said first reflecting surface, thereby to concentrate light received from said element onto said first reflecting surface.

11. A holographic display apparatus according to claim 10, wherein:
    said first and second curved reflecting surfaces touch one another.

12. A holographic display apparatus according to claim 10, wherein:
    said support is arranged to receive and support an annular hologram in cylindrical or tapered form, and said first and second curved reflecting surfaces comprise oppositely-directed frusto-conical surfaces disposed concentrically with, adjacent to and facing a free end of a said annular hologram supported on said support so as to direct on to an outer surface of annular hologram light emanating from a light source disposed within an interior of the hologram.

13. A holographic display apparatus according to claim 12, wherein:
    said first and second frusto-conical surfaces touch one another at a common boundary.

14. A holographic display apparatus according to claim 10, wherein:
    said support is arranged to receive and support an annular hologram in cylindrical or tapered form, and said first and second curved reflecting surfaces comprise annular curved surfaces which are disposed concentrically with, adjacent to and facing a free end of a said annular hologram supported on said support, which curved surfaces are arranged so as to direct on to outer surface of annular hologram light emanating from a light source disposed within an interior of the hologram.

15. A holographic display apparatus according to claim 14, wherein:
said annular curved reflecting surfaces coalesce.

16. A holographic display apparatus for displaying an image holographically embodied in a hologram, whether of a reflection type or of a transmission type, comprising:
a hologram support for receiving and supporting said hologram in a viewing position;
a light source disposed adjacent a boundary of said hologram support in a predetermined position such that light radiating from said light source when energized cannot fall directly onto a hologram supported on said support; and
a lens-less, light directing means which includes a light reflecting means disposed adjacent said boundary of said support and arranged to direct light from said light source onto said hologram supported on said support so as to be incident on said hologram at a predetermined acute reference angle which corresponds substantially to an angle of incidence relative to said hologram of a predetermined reference light used in producing that hologram, wherein
said light source and said light reflecting means are disposed beyond an end boundary of said hologram, said reflecting means includes a reflecting surface which is curved in a first manner such as to collimate light reflected thereby onto said hologram, said reflecting surface is also curved in a second manner orthogonal to said first manner of curvature of that reflecting surface thereby to concentrate light received from said light source onto said hologram, and said support is arranged to receive and support an annular hologram of cylindrical or tapered form, and said reflecting surface comprises a concave, bowl-shaped surface which is disposed concentrically with, adjacent to, and facing one end of said annular hologram carried on said support, said light source being disposed between said reflecting surface and an adjacent end of said annular hologram.

17. A holographic display apparatus for displaying an image holographically embodied in a hologram, whether of a reflection type or of a transmission type, comprising:
a hologram support for receiving and supporting said hologram in a viewing position;
a light source disposed adjacent a boundary of said hologram support in a predetermined position such that light radiating from said light source when energized cannot fall directly onto a hologram supported on said support; and
a lens-less, light directing means which includes a light reflecting means disposed adjacent said boundary of said support and arranged to direct light from said light source onto said hologram supported on said support so as to be incident on said hologram at a predetermined acute reference angle which corresponds substantially to an angle of incidence relative to said hologram of a predetermined reference light used in producing that hologram, wherein
said light source and said light reflecting means are disposed beyond an end boundary of said hologram, said reflecting surface means includes two reflecting surfaces for reflecting light from said element twice before it becomes incident on said hologram, said reflecting surfaces are both planar, and said reflecting surfaces touch one another.

18. A holographic display apparatus for displaying an image holographically embodied in a hologram, whether of a reflection type or of a transmission type, comprising:
a hologram support for receiving and supporting said hologram in a viewing position;
a light source disposed adjacent a boundary of said hologram support in a predetermined position such that light radiating from said light source when energized cannot fall directly onto a hologram supported on said support; and
a lens-less light directing means which includes a light reflecting means disposed adjacent said boundary of said support and arranged to direct light from said light source onto said hologram supported on said support so as to be incident on said hologram at a predetermined acute reference angle which corresponds substantially to an angle of incidence relative to said hologram of a predetermined reference light used in producing that hologram, wherein
said hologram support includes (a) a fixed part, (b) a movable hologram-supporting part which is movable relative to said fixed part thereby to effect movement of said hologram relative to said light reflecting means, and driving means for effecting movement of said movable hologram supporting part to effect changes in the image displayed.

19. A holographic display apparatus according to claim 18, wherein:
said movable hologram supporting part includes means for supporting a plurality of holograms, and said driving means is arranged to transport selected holograms sequentially to a viewing position in which they are illuminated by light reflected by said light reflecting means.

20. A holographic display apparatus for displaying an image holographically embodied in a hologram, whether of a reflection type or of a transmission type, comprising:
a hologram support for receiving and supporting said hologram in a viewing position;
a light source disposed adjacent a boundary of said hologram support in a predetermined position such that light radiating from said light source when energized cannot fall directly onto a hologram supported on said support; and
a lens-less, light directing means which includes a light reflecting means disposed adjacent said boundary of said support and arranged to direct light from said light source onto said hologram supported on said support so as to be incident on said hologram at a predetermined acute reference angle which corresponds substantially to an angle of incidence relative to said hologram of a predetermined reference light used in producing that hologram, and further comprising a plurality of other sources of reference light, and means for energizing said light sources in sequence or in a sequence of combinations thereof, thereby to display sequentially different images or groups of images embodied in said hologram.

21. A holographic display apparatus for displaying an image holographically embodied in a hologram, whether of a reflection type or of a transmission type, comprising:
    a hologram support for receiving and supporting said hologram in a viewing position;
    a light source disposed adjacent a boundary of said hologram support in a predetermined position such that light radiating from said light source when energized cannot fall directly onto a hologram supported on said support; and
    a lens-less, light directing means which includes a light reflecting means disposed adjacent said boundary of said support and arranged to direct light from said light source onto said hologram supported on said support so as to be incident on said hologram at a predetermined acute reference angle which corresponds substantially to an angle of incidence relative to said hologram of a predetermined reference light used in producing that hologram, and further comprising means for temporarily displacing said light source, thereby to cause a displayed image to move relative to said hologram support.

22. A holographic display apparatus for displaying an image holographically embodied in a hologram, whether of a reflection type or of a transmission type, comprising:
    a hologram support for receiving and supporting said hologram in a viewing position;
    a light source disposed adjacent a boundary of said hologram support in a predetermined position such that light radiating from said light source when energized cannot fall directly onto a hologram supported on said support; and
    a lens-less, light directing means which includes a light reflecting means disposed adjacent said boundary of said support and arranged to direct light from said light source onto said hologram supported on said support so as to be incident on said hologram at a predetermined acute reference angle which corresponds substantially to an angle of incidence relative to said hologram of a predetermined reference light used in producing that hologram, and further comprising a movable shutter means arranged for movement into and out of a path of light emanating from said light source thereby to cut off or diminish the light incident on said light reflecting means, and means for driving said shutter means to effect variation in a displayed image.

23. A holographic display apparatus for displaying an image holographically embodied in a hologram, whether of a reflection type or of a transmission type, comprising:
    a hologram support for receiving and supporting said hologram in a viewing position;
    a light source disposed adjacent a boundary of said hologram support in a predetermined position such that light radiating from said light source when energized cannot fall directly onto a hologram supported on said support; and
    a lens-less, light directing means which includes a light reflecting means disposed adjacent said boundary of said support and arranged to direct light from said light source onto said hologram supported on said support so as to be incident on said hologram at a predetermined acute reference angle which corresponds substantially to an angle of incidence relative to said hologram of a predetermined reference light used in producing that hologram, wherein the reference light source comprises a light radiating element having an associated reflector, of which reflector the focal point lies at or closely adjacent a light emitting zone of the light radiating element, whereby light emitted to the rear of the source is reflected back through or closely adjacent the light radiating element so as to enhance illumination of the hologram.

24. A holographic display apparatus for displaying an image holographically embodied in a hologram of reflection type or transmission type, comprising:
    a hologram support for receiving and supporting a hologram in a viewing position;
    a light source disposed on one side of said hologram support and remote from a selected boundary of said support, in a predetermined baffled position such that light radiating from said light source when energized cannot fall directly onto a hologram supported on said support; and
    a light reflecting means including two light reflecting surfaces disposed adjacent one another and adjacent said boundary of said support and arranged to direct light from said light source towards a side of said support remote from said light source, said light being reflected by said two light reflecting surfaces so as to transverse said boundary of said support and to be incident on said hologram positioned on said support at a predetermined acute reference angle, which angle corresponds substantially to an angle of incidence relative to said hologram of a predetermined reference light used in producing that hologram.

25. A holographic display means according to claim 24, wherein:
    said light source and said light reflecting means are disposed beyond an end boundary of said hologram.

26. A holographic display apparatus according to claim 25, wherein:
    said light reflecting means includes a reflecting surface which is curved in a first manner such as to collimate the light reflected thereby onto said hologram.

27. A holographic display apparatus according to claim 26, wherein:
    said reflecting surface is also curved in a second manner orthogonal to said first manner of curvature of that reflecting surface, thereby to concentrate light received from said light source onto said hologram.

28. A holographic display apparatus according to claim 24, wherein:
    a first one of said reflecting surfaces is curved in a first manner so as to collimate light reflected onto said hologram supported on said support.

29. A holographic display apparatus according to claim 28, wherein:
    the second one of said reflecting surfaces is curved in a second manner orthogonal to said first manner of curvature of said first reflecting surface whereby to concentrate light received from said light source onto said first reflecting surface.

30. A holographic display apparatus according to claim 29, wherein:
said first and second curved reflecting surfaces touch one another.

31. A holographic display apparatus according to claim 29, wherein:
said support is arranged to receive and support an annular hologram in cylindrical or tapered form, and said first and second curved reflecting surfaces comprise oppositelydirected frusto-conical surfaces disposed concentrically with, adjacent to and facing a free end of said annular hologram supported on said support so as to direct onto an outer surface of the annular hologram light emanating from said light source disposed within an interior of the hologram.

32. A holographic display apparatus according to claim 31, wherein:
said first and second frusto-conical surfaces touch one another at a common boundary.

33. A holographic display apparatus according to claim 29, wherein:
said support is arranged to receive and support an annular hologram in cylindrical or tapered form, and said first and second curved reflecting surfaces comprise annular curved surfaces which are disposed concentrically with, adjacent to and facing a free end of said annular hologram supported on said support, which curved surfaces are arranged so as to direct onto an outer surface of the annular hologram light emanating from said light source disposed within an interior of the hologram.

34. A holographic display apparatus according to claim 33, wherein:
said annular curved reflecting surfaces coalesce.

35. A holographic display apparatus according to claim 34, wherein:
said hologram support includes a (a) a fixed part, (b) a movable hologram-supporting part which is movable relative to said fixed part to effect movement of said hologram relative to said light reflecting means, and (c) driving means for effecting movement of said movable hologram supporting part, thereby to effect changes in images displayed.

36. A holographic display apparatus according to claim 34, wherein:
said movable hologram supporting part includes means for supporting a plurality of holograms, and said driving means is arranged to transport selected holograms sequentially into a viewing position in which they are illuminated by light reflected by said light reflecting means.

37. A holographic display apparatus according to claim 24, wherein:
said reflecting surfaces are both planar.

38. A holographic display apparatus according to claim 37, wherein:
said reflecting surfaces tough one another.

39. A holographic display apparatus according to claim 24, wherein:
said hologram support includes (a) a fixed part, (b) a movable hologram-supporting part which is movable relative to said fixed part, whereby to effect movement of said hologram relative to said light reflecting means, and (c) driving means for effecting movement of said movable hologram supporting part, whereby to effect changes in images displayed.

40. A holographic display apparatus according to claim 39, wherein:
said movable hologram supporting part includes means for supporting a plurality of holograms, and said driving means is arranged to transport selected holograms sequentially into a viewing position in which they are illuminated by light reflected by said light reflecting means.

41. A holographic display apparatus according to claim 24, wherein:
said light reflecting means comprises a planar reflecting surface for reflecting light from said light source directly onto said hologram at said reference angle.

42. A holographic display apparatus according to claim 24, wherein:
said hologram support is arranged to receive and support a hologram in planar form.

43. A holographic display apparatus according to claim 24, wherein:
said hologram support is arranged to receive and support an annular hologram of cylindrical or tapered form, and said reflecting surface comprises a concave, bowl-shaped surface which is disposed concentrically with, adjacent to, and facing one end of said annular hologram carried on said support, said light source being disposed between said reflecting surface and an adjacent end of said annular hologram.

44. A holographic display apparatus according to claim 24, further comprising:
a plurality of other sources of reference light, and means for energizing said light sources in sequence or in a sequence of combinations thereof, thereby to display sequentially different images or groups of images embodied in said hologram.

45. A holographic display apparatus according to claim 24, further comprising:
means for temporarily displacing said light source, thereby to cause the displayed image to move relative to said hologram support.

46. A holographic display apparatus according to claim 24, further comprising:
a movable shutter means arranged for movement into and out of a path of light emanating from said light source thereby to cut off or diminish light incident on said light reflecting means, and means for driving said shutter means to effect variation in a displayed image.

47. A holographic display apparatus according to claim 24, wherein:
the light source comprises a light radiating element having an associated reflector, of which reflector a focal point lies at or closely adjacent a light emitting zone of the light radiating element, whereby light emitted a behind the source is reflected back through or closely adjacent the light radiating element so as to enhance illumination of the hologram.

48. A holographic display apparatus according to claim 24, further comprising:
a plurality of other sources of reference light, and means for energizing said light source in sequence or in a sequence of combinations thereof, thereby to display sequentially different images or groups of images embodied in said hologram.

49. A holographic display apparatus according to claim 24, further comprising:
means for temporarily displacing said light source, thereby to cause a displayed image to move relative to said hologram support.

50. A holographic display apparatus according to claim 24, further comprising:
a movable shutter means arranged for movement into and out of path of light emanating from said light source to cut off or diminish light incident on said light reflecting means, and means for driving said shutter means thereby to effect variation in a displayed image.

51. A holographic display apparatus according to claim 24, wherein:
the light source comprises a light radiating element having an associated reflector, of which reflector a focal point lies at or closely adjacent a light emitting zone of the light radiating element, whereby light emitted behind the source is reflected back through or closely adjacent the light radiating element so as to enhance illumination of the hologram.

* * * * *